(12) United States Patent
Pakhomov et al.

(10) Patent No.: US 7,057,974 B2
(45) Date of Patent: Jun. 6, 2006

(54) DEVICE FOR SENSING SEISMIC AND ACOUSTIC VIBRATIONS

(75) Inventors: Alexander Pakhomov, Yonkers, NY (US); E. Tim Goldburt, Chappaqua, NY (US)

(73) Assignee: General Phosphorix LLC, Ardsley, NY (US)

(*) Notice: Subject to any disclaimer, the term of this patent is extended or adjusted under 35 U.S.C. 154(b) by 0 days.

(21) Appl. No.: 10/659,332

(22) Filed: Sep. 11, 2003

(65) Prior Publication Data
US 2004/0053647 A1 Mar. 18, 2004

Related U.S. Application Data

(62) Division of application No. 09/731,202, filed on Dec. 7, 2000, now Pat. No. 6,678,536.

(51) Int. Cl.
*G01V 1/18* (2006.01)
(52) U.S. Cl. ..................................... 367/178
(58) Field of Classification Search ............... 367/13, 367/18, 178; 175/40; 166/250.01; 73/649; 181/122
See application file for complete search history.

(56) References Cited

U.S. PATENT DOCUMENTS

| | | | | |
|---|---|---|---|---|
| 4,001,561 A | * | 1/1977 | Quaintance | 434/179 |
| 4,088,556 A | * | 5/1978 | Pellegri et al. | 204/222 |
| 4,907,453 A | * | 3/1990 | Marlow et al. | 73/584 |
| 5,021,766 A | * | 6/1991 | Genahr et al. | 340/544 |
| 5,059,909 A | * | 10/1991 | O'Brien | 324/457 |
| 5,245,290 A | * | 9/1993 | Cannon et al. | 324/457 |
| 5,387,869 A | * | 2/1995 | Enomoto | 324/348 |
| 5,461,915 A | * | 10/1995 | Heyler | 73/431 |
| 5,581,232 A | * | 12/1996 | Tanaka et al. | 340/435 |
| 6,055,214 A | * | 4/2000 | Wilk | 367/99 |
| 6,449,563 B1 | * | 9/2002 | Dukhin et al. | 702/22 |
| 2004/0115501 A1 | * | 6/2004 | Hinokuma et al. | 429/33 |

OTHER PUBLICATIONS

Cash, G. G., "An alternative structure for C/sub 576", Fullerence Science and Technology (USA), vol. 7, No. 5, pp. 733-741 1999, Published: Marcel Dekker.*

* cited by examiner

*Primary Examiner*—Ian J. Lobo
(74) *Attorney, Agent, or Firm*—I. Zborovsky

(57) ABSTRACT

A device for sensing seismic and/or acoustic vibrations, has a body of a particulate material composed of a plurality of individual particles, and a system for determining changes in electrical conductivity of the particulate material caused by seismic and acoustic vibrations.

9 Claims, 4 Drawing Sheets

DEVICE FOR SENSING SEISMIC AND ACOUSTIC VIBRATIONS

CROSS-REFERENCE TO A RELATED APPLICATION

This application is a division of patent application Ser. No. 09/731,202, filed Dec. 7, 2000, now U.S. Pat. No. 6,678,536.

BACKGROUND OF THE INVENTION

The present invention relates to a device for sensing seismic and acoustic vibrations of the ground as well as buildings, etc.

Sensing devices of the above mentioned general type are known in the art. The known devices are formed as velocity sensors which sense a vibration speed. Such sensing devices however are sensitive to sources of seismic and acoustic noise. It is therefore believed to be advisable to further improve the sensing devices of this type.

SUMMARY OF THE INVENTION

Accordingly, it is an object of the present invention to provide a device for sensing seismic and acoustic vibrations, which avoids the disadvantages of the prior art.

In keeping with these objects and with others which will become apparent hereinafter, one feature of present invention resides, briefly stated, in a device for sensing seismic and acoustic vibrations which has a body of a particulate material composed of a plurality of individual particles; and means for determining changes in electrical conductivity of the particulate material caused by seismic and acoustic vibrations.

When the sensing device is designed in accordance with the present invention, it is formed as a displacement sensor, in contrast to traditional seismic sensors which are velocity sensors. Therefore, it is possible to detect for example intruders which try to use special methods of movement over the ground to overcome zones which are guarded by the known seismic systems. Sensors devices in accordance with the present invention are sensitive only to signals which are generated by an intruder which moves over the sensing device. Signals from objects which are movable outside of the sensing device or signals from other sources of seismic and acoustic noise are significantly weaker. Therefore, it is possible to form with such sensing devices linear and area zones for detection with precise borders of any shape.

The sensing devices in accordance with the present invention have a significantly higher noise resistance. It is therefore possible to use such sensing devices in systems which are located in the immediate vicinity to sources of intense seismic noises, such as highways, industrial zones, etc., and also when outside of the zones to be protected there are movable objects of the same type as the intruders. The area of sensing of such a sensing device is significantly increased and therefore it is possible to create systems which actually have zero level of false alarms, and to reliably detect intruders of specific types, such as for example walking or running people without allowing them to pass by undetected, without reacting to the presence in the corresponding zone of other objects such as animals, vehicles, etc.

The sensing device of the present invention can be made as an areal device to cover an area and is therefore significantly different from linear sensing devices, such as optofibers, cables, hoses filled with water, triboelectric cables, etc.

The use of these known devices does not exclude movement of intruders without being detected and require the use of several parallel lines of such sensors.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
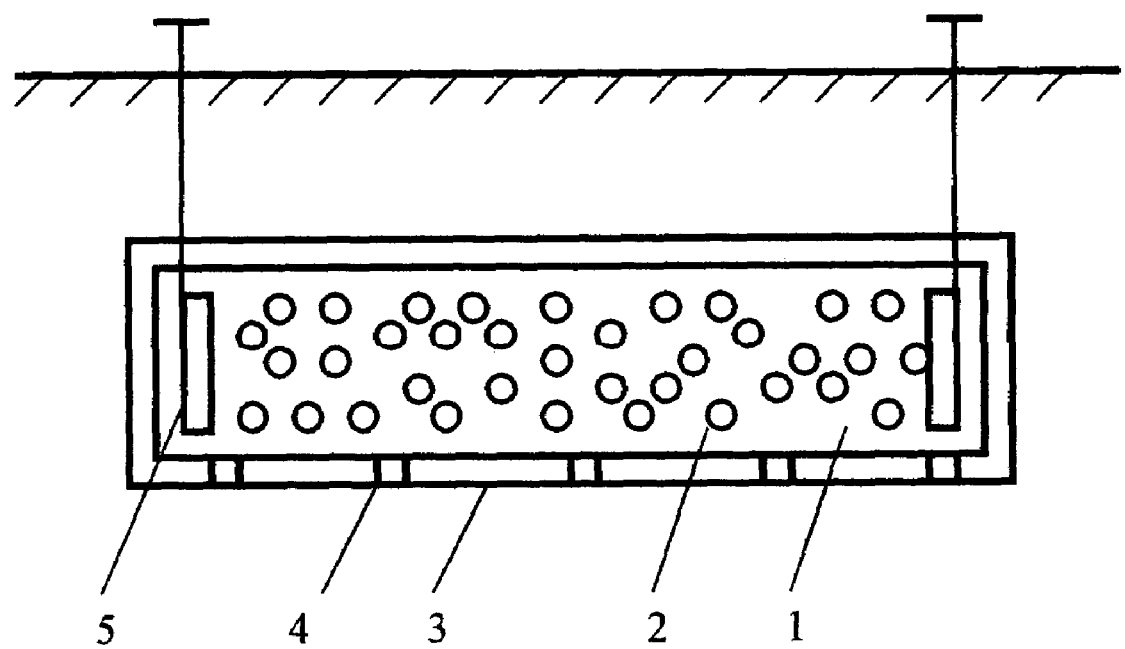
FIG. 1 is a view schematically showing a longitudinal cross-section of a sensing device in accordance with the present invention.
Figure 2:
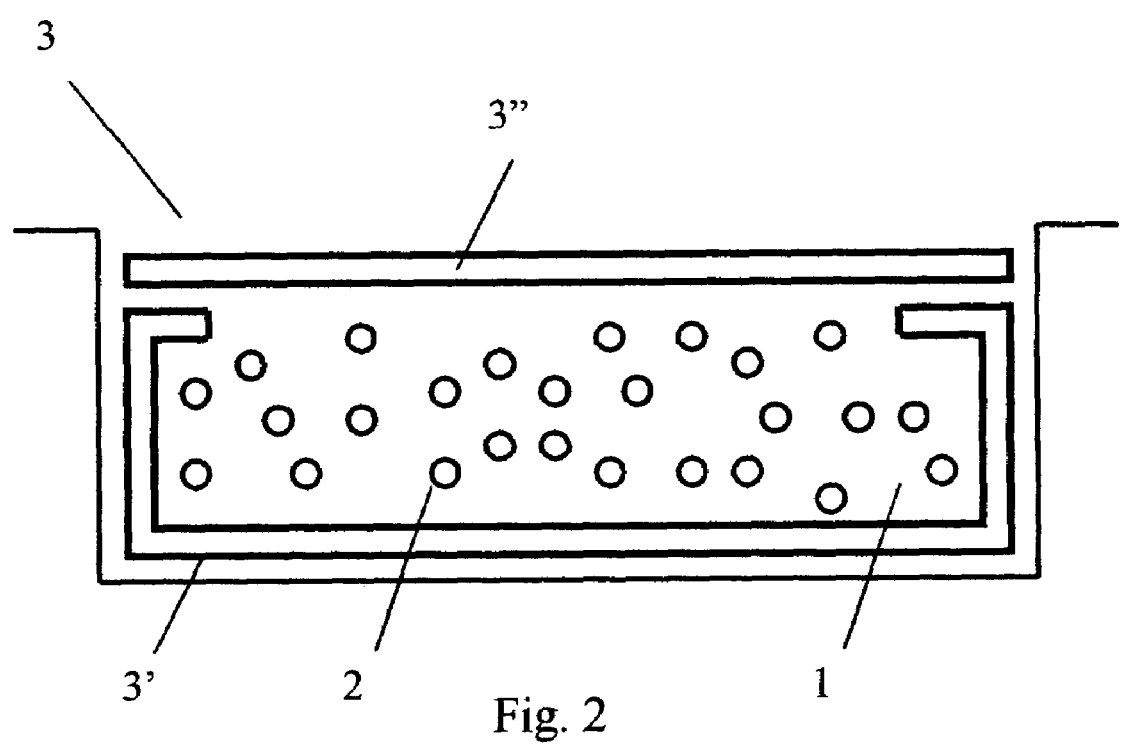
FIG. 2 is a view showing a transverse cross-section of the sensing device in accordance with the present invention.

The sensing device in accordance with the present invention has a body which is identified as a whole with reference numeral 1 and composed of a particulate material including a plurality of particles 2. The body 1 is formed as a substantially flat, three dimensional object which can have significant horizontal sizes, for examples from tens to hundred meter and a relatively small vertical size for example tens of centimeters.

Figure 4A:
FIGS. 4a–4e are plan views of the device in accordance with various modifications of the present invention.
Figure 4B:
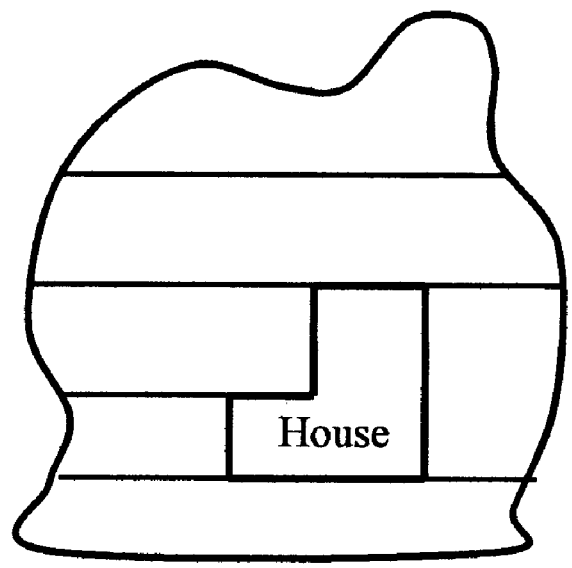
Figure 4C:
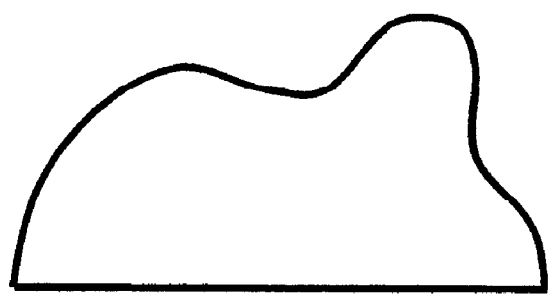
Figure 4D:
Figure 4E:

The body 1 can have a rectangular shape as shown in FIG. 4a, for example as a rectangle with the sizes 7–15 meter by 35–75 meter. Such sensing devices can be used for guarding of parameters having significant sizes. On the other hand, the shape on a horizontal plane can be arbitrary in correspondence with the shape of the zone to be guarded, as can be seen for example in FIG. 4b wherein the sensing device is used for guarding an access to a house, and in FIGS. 4c, 4d, 4e. If a zone to be guarded has a significant length and a complicated shape, the zone can be provided with a plurality of sensors of an arbitrary shape which adjoin one another. If the surface of the zone to be guarded is not exactly horizontal, the sensing device can have a shape which corresponds to the shape non-horizontal of the zone to be guarded.

The particles 2 of the body 1 of the particulate material can be composed of an electrically conductive material. For example, they can be formed of real carbon dust, etc. On the other hand, the particles can be composed of a non electrically conductive material, for example plastic, and then treated with an electrically conductive substance for example with an aqueous emulsion of fullerenes or nanotubes. It is of course also possible that the particles are composed of an electrically conductive material and additionally are treated with electrically conductive substance, for example specified herein above, to enhance their electrically conductive properties. Thus, the carbon dust can be treated with the aqueous emulsion of fullerenes or nanotubes. When the particles contact with one another, they produce electrical contact and therefore electrical conductivity of the whole body is provided.

The body 1 is arranged in a ground, for example in a trench formed in the ground and having preferably a flat bottom and vertical walls. The particulate material is introduced into the trench and assumes the required shape so as to follow the shape of the trench. The upper surface of the body is then straightened. It is recommended that the upper surface of the body 1 be arranged at a depth of approximately 0.20–0.3 meter, and its thickness is approximately 0.1–0.5 meter.

In accordance with a further feature of the present invention the body of the material 1 can be confined in a casing which is identified as a whole with reference numeral 3. It is used for maintaining the shape of the body of the particulate material for example after its introduction into a trench in the ground, or in other words to prevent displacement of the particulate material in the ground during the use. The casing 3 can be composed of an environment resistant material, which is non electrically conductive, for example a plastic material. It can be provided with a plurality of perforations 4 for ventilation purposes, mainly located in the lower area of the casing. At the same time the upper part of the casing can be solid and water-impermeable so as to prevent excessive moisturizing of the particulate material by water from rain and melting snow. The casing can be composed of a lower part 3' and an upper part 3" which are separate from one another.

In use, the lower part 3' is first placed on the bottom of the trench and its sides are turned upwardly along the vertical walls of the trench. Then the particulate material is placed on the lower portion 3" and uniformly distributed. Thereafter, the upper portion 3" is placed on top so that its edges reach the vertical walls. The ends of the lower portion 3' are turned under the upper portion 3', and then soil is placed into the trench on top of it. The joining line between the lower and upper parts of the casing can be for example thermally welded.

Figure 5:
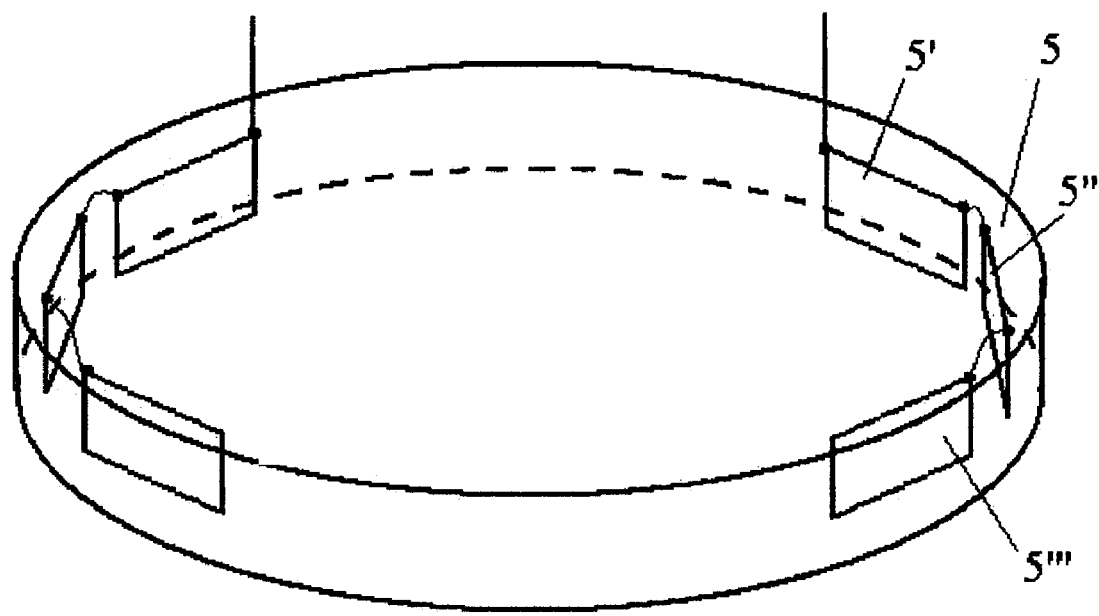
FIG. 5 is a perspective view of the inventive device in accordance with with a further modification of the present invention.

The sensing device further has electrodes which are identified with reference numeral 5. The electrodes are formed as electrode plates for connecting corresponding electronic devices to the body of material 1 so as to monitor an electrical resistance of the body of the particulate material and process the results of monitoring. The electrodes 5 can be formed as thin metallic, non corrosive plates having for example a rectangular shape, and isolated and screened wires can be connected to the electrodes. The electrodes 5 are located at both sides of the body of the material 1. They are introduced into the body 1 over its whole depth. The vertical size of the electrode plates substantially corresponds to the thickness of the body of the material 1. The horizontal size of the electrode plates corresponds to an average width of the body of the material 1 in a horizontal plane. The electrodes can be also formed not as uninterrupted plate parts, but instead they can be composed of a plurality of plates which are electrically connected with one another and can be curved. The plate parts which form a single electrode are arranged along the edge of the body of material 1 one after the other, as shown for example in FIG. 5 and identified with reference numeral 5', 5", 5"', etc.

When an intruder moves over the ground surface with the sensing device located underneath, microdisplacements and microvibrations of the body 1 of the material occur. As a result, density and electrical conductivity of the body 1 of the material 1 are changed, and also electrical resistance of the body of the material is changed, which is measured between the electrodes. These changes in the resistance caused by the intruder represent information or a signal which is used for analysis and making a decision about the presence or absence of an intruder.

Figure 3:
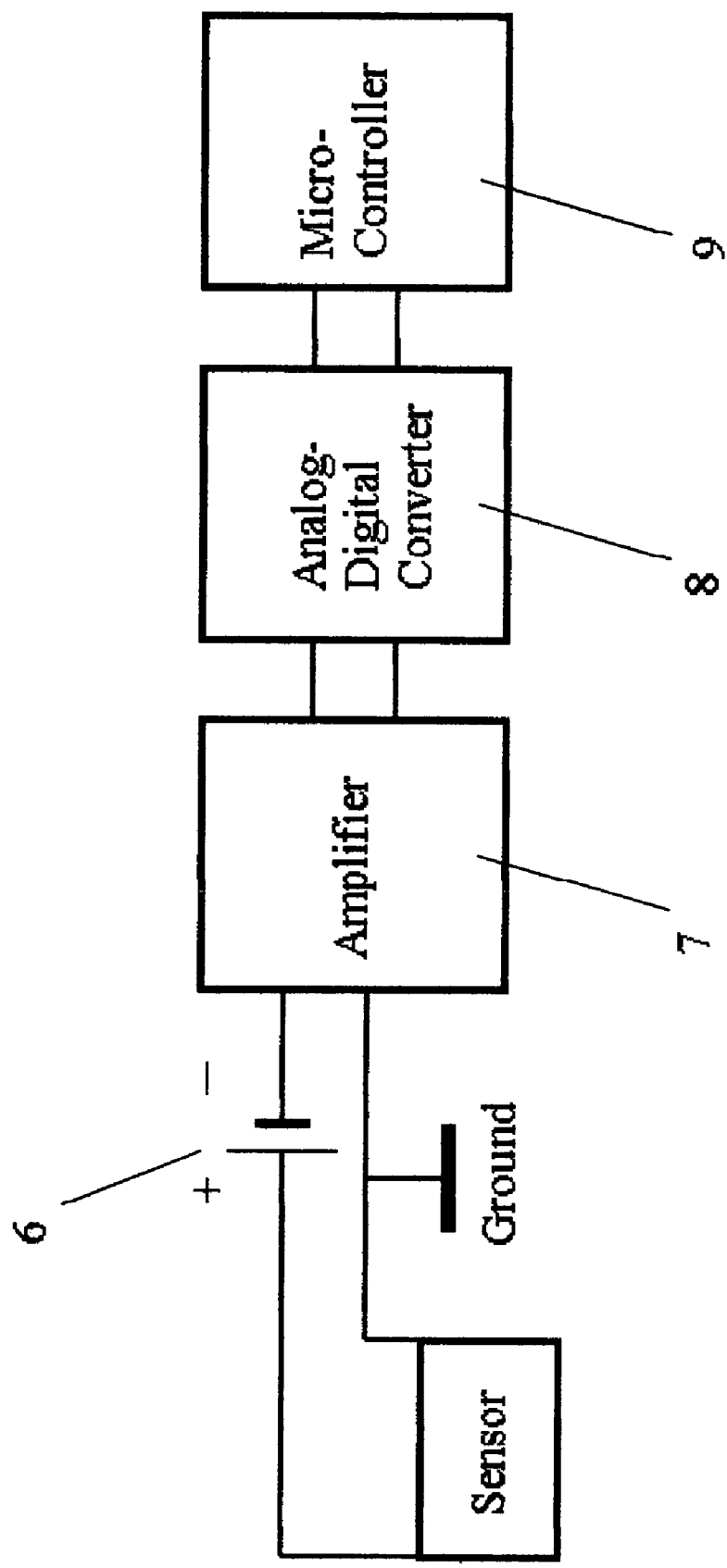
FIG. 3 is a view showing the inventive sensing device together with its electronic equipment.

FIG. 3 shows an electronic circuit of an information channel for the sensing device. It includes a voltage source, for example of 3–30 Volt. an amplifier 7, an analog-digital convertor 8, a microcontroller 9, and a transceiver if necessary.

The changes of electrical resistance of the voltage supplied by the source 6 are amplified by the amplifier 7, then converted into a digital signal by the convertor 8, and analyzed by the microcontroller 9.

In order to use the inventive sensing device, first experimentally it is determined what changes in the electrical resistance in the body of the material correspond to the presence of an intruder. During the use of the system, when an intruder walks, runs, or moves in any other way on the ground above the sensing device, the electrical resistance of the body of material 1 changes, and this change is detected and interpreted as the presence of the intruder.

It will be understood that each of the elements described above, or two or more together, may also find a useful application in other types of constructions differing from the types described above.

While the invention has been illustrated and described as embodied in device for sensing seismic and acoustic vibrations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for sensing seismic and/or acoustic vibrations, comprising a body of a particulate material composed of a plurality of individual particles; and means for determining changes in electrical conductivity of the particulate material caused by seismic and/or acoustic vibrations, wherein said particles are not electrically conductive and are treated with an electrically conductive substance.

2. A device as defined in claim 1, wherein said electrically conductive substance is a substance selected from the group consisting of fullerenes and nanotubes.

3. A device as defined in claim 1, wherein said non electrically conductive particles are composed of plastic.

4. A device for sensing seismic and/or acoustic vibrations, comprising a body of a particulate material composed of a plurality of individual non-conductive particles which are treated with an electrically conductive substance; means for determining changes in electrical conductivity of the particlate material caused by seismic and/or acoustic vibrations; and a casing which encloses said body of particulate material, said casing being composed of a non electrically conductive material and has a plurality of ventilating perforations, said casing has an upper area which is not provided with said perforations, and a lower area provided with said perforations, so that said upper area of said casing is solid and water-impermeable to prevent excessive moisturizing of the particulate material by water from rain and melting snow.

5. A device as defined in claim 4, wherein said casing is composed of a flexible material.

6. A device as defined in claim 4, wherein said non conductive particles are composed of plastic.

7. A device for sensing seismic and/or acoustic vibrations, comprising a body of particulate material composed of a plurality of individual non-conductive particles treated with an electrically conductive substance; and means for determining changes in electrical conductivity of the particulate material caused by seismic and/or acoustic vibrations, said means including at least two electrodes arranged in contact with said body of said particulate material and spaced from one another; and means for determining voltage changes between the electrodes, said electrodes having a height substantially corresponding to a height of said body of said particulate material and a width substantially corresponding to a width of said body of said particulate material.

8. A device as defined in claim 7, wherein each of said electrodes is composed of a plurality of electrode parts electrically connected with one another, said means further including a voltage source, an amplifier, an analog-digital convertor and a microcontroller.

9. A device as defined in claim 4, wherein said non conductive particles are composed of plastic.

\* \* \* \* \*